(No Model.)
W. L. ROTH.
NURSING BOTTLE.
No. 571,245. Patented Nov. 10, 1896.
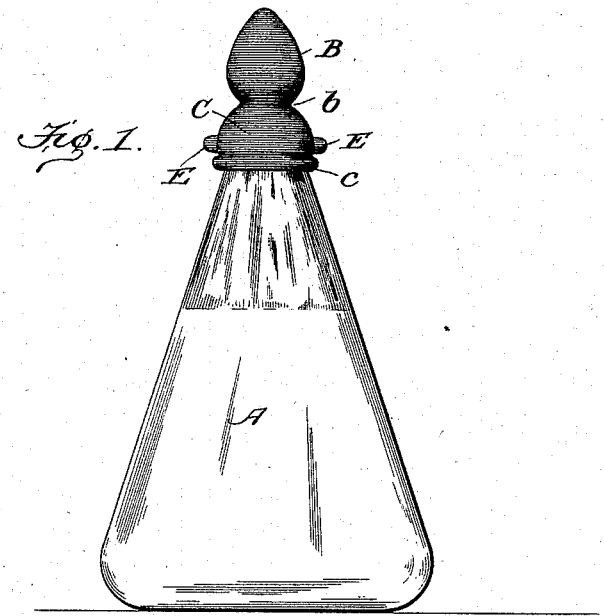
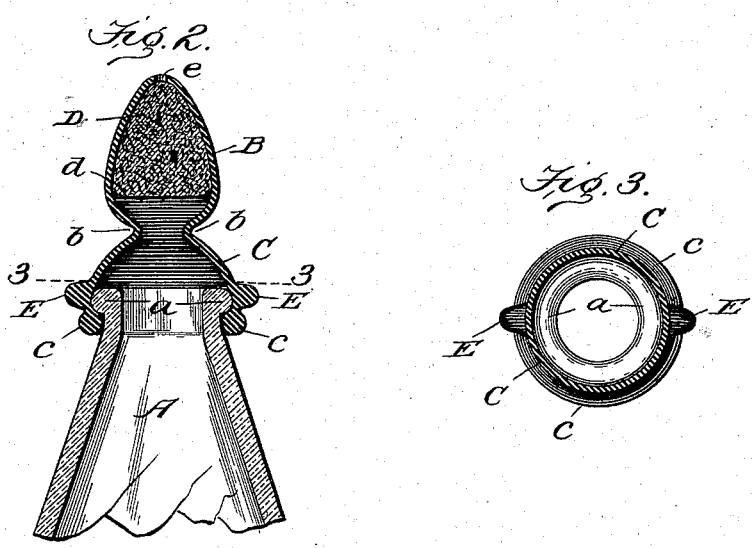
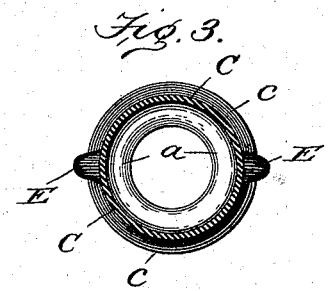
WITNESSES:
Edwin L. Bradford
H. J. Woodhull
INVENTOR
Wm L. Roth
BY
Wm E. Dyre
ATTORNEY.

UNITED STATES PATENT OFFICE.

WILLIAM L. ROTH, OF WASHINGTON, DISTRICT OF COLUMBIA.

NURSING-BOTTLE.

SPECIFICATION forming part of Letters Patent No. 571,245, dated November 10, 1896.

Application filed April 6, 1896. Serial No. 586,379. (No model.)

*To all whom it may concern:*

Be it known that I, WILLIAM L. ROTH, a citizen of the United States, residing at Washington, in the District of Columbia, have invented certain new and useful Improvements in Nursing-Bottles; and I do hereby declare the following to be a full, clear, and exact description of the invention, such as will enable others skilled in the art to which it appertains to make and use the same.

My invention relates to nursing-bottles for the use of infants and contemplates the production of an inexpensive and satisfactory device of its class, consisting of a bottle with a nipple therefor, having among its objects the filtration of liquids drawn therefrom, means whereby the nipple is readily adjusted upon the neck of its bottle, and finally a bottle of shape best adapted for cleaning.

The invention will be hereinafter described, and particularly pointed out in the claims following.

In the accompanying drawings, which form part of this specification, and whereon like letters indicate corresponding parts wherever employed—

Figure 1 represents my invention in side elevation, showing the exterior of nipple employed with adjusting-knobs and the truncated cone outline of bottle. Fig. 2 is a fragmentary view illustrating a central vertical section of the nipple, the filtering material contained therein, side knobs for adjusting same upon bottle, and the neck of a bottle in connection; and Fig. 3 is a horizontal section through base of my improved nipple taken on the line 3 3 of Fig. 2.

Reference being had to the drawings and letters thereon, A indicates a bottle or receptacle for infants' food, preferably made of glass or other vitreous material in truncated cone form with somewhat flattened sides and provided at its upper open end or neck with a surrounding rim or bead $a$.

B represents the nipple of my improved construction, by preference molded in pliable caoutchouc or india-rubber, having a constricted neck $b$ for purposes that will later appear.

C is the diverging base of nipple B, surrounded upon its lower edge by an integral enlargement or roll $c$, adapted by its inherent elasticity to rest beneath and be firmly retained in place by the rim $a$ of its bottle A.

D is a porous filtering material located within the nipple B above its constricted neck $b$, serving as a filter through which all substance must pass when drawn from bottle A. This filter or strainer D may consist of any suitable porous or fibrous filtering material, but by choice a piece of sponge is employed having its base or lower surface $d$ somewhat squared, as shown by Fig. 2, to more effectually retain same in place. On the base C of nipple B at points diametrically opposite and just above the base-roll $c$ are cast or otherwise produced side lugs or knobs E, the function of which is to assist in the adjustment of the nipple upon its bottle, particularly when the former is moist and slippery.

This being substantially a description of my invention, its use and operation are as follows:

Filter D having been inserted through the lower open end of nipple B may be forced past its constricted neck $b$ into the conical head of the nipple to a position shown by Fig. 2, the elasticity of the nipple, together with the compressibility of the filtering material, readily permitting this adjustment. Bottle A having been provided with the requisite amount of milk or other article of infants' food in liquid state is now capped by the filter-containing nipple B, such adjustment of the nipple upon its bottle being greatly facilitated by the side surface-knobs E E, which afford most convenient finger-holds and enable the roll $c$ to be quickly and accurately drawn over the rim $a$ of its bottle A. This quality is of utmost advantage in view of the normal condition of nipples at times of adjustment, which is moist and slippery.

A nursing-bottle being thus equipped and in condition for use, it will be noted that the filtering-body D is securely held in its operative position within the head of nipple B, so as to effectually cover and guard its only outlet, the central opening $e$ in apex of the nipple; also that several qualities inherent in both nipple and filter combine to retain the filter in such position against accidental dislodgement, namely, the restricted form of neck $b$, the elasticity of the nipple itself, the natural expansive and swelling properties of the body D when sponge is used, and finally the squared base or lower periphery of the filtering-body which rests upon the inner walls of nipple at points where they rapidly converge.

My invention being constructed substantially as above described and its several parts having been assembled as set forth, it will be observed that use of the device by an infant necessitates the passage of all liquids drawn from the bottle A directly through the body D, and consequently insures an effectual filtering or straining thereof. It will be noted further that a filtering material thus constructed and applied may be readily withdrawn from the nipple for purposes of cleaning or a new one substituted with ease, and as a means of insuring further cleanliness it will be seen, upon reference to Fig. 1, that the diverging sides of the bottle A are plain straight surfaces, easily cleaned and kept clean. Furthermore, it is apparent that the filter D while porous and flexible enough for its purpose has at same time body sufficient to prevent all tendency in the sides of nipple B, particularly at the constricted neck $b$, from sticking or gumming together during use, thus overcoming a serious result incident to such nipples generally.

This being substantially a description of my invention, what I claim, and desire to secure by Letters Patent, is—

1. In a nursing-bottle the combination with a nipple having a constricted neck, of a porous filtering-body located above said neck, substantially as described.

2. In a nursing-bottle the combination with a nipple having a constricted neck, of a porous filtering-body located above the neck, and projecting side knobs below said neck the latter to facilitate adjustment of the nipple in place, substantially as described.

3. In a nursing-bottle the combination with a nipple having a constricted neck, of a conical filtering-body with squared base located above the neck, and diametrically opposite side knobs projecting below said neck, to facilitate adjustment, substantially as described.

4. In a nursing-bottle having plain diverging sides, the combination with a nipple having a constricted neck, a porous filtering-body located above the neck, and projecting side knobs arranged below said neck to facilitate adjustment, substantially as described.

In testimony whereof I subscribe my signature in presence of two witnesses.

WILLIAM L. ROTH.

Witnesses:
WM. E. DYRE,
HUGH M. STERLING.